(12) United States Patent
Sano et al.

(10) Patent No.: US 6,519,135 B2
(45) Date of Patent: Feb. 11, 2003

(54) CHIP CAPACITOR AND METHOD OF MANUFACTURING SAME

(75) Inventors: Mitsunori Sano, Minato-ku (JP); Takashi Kono, Minato-ku (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 10/140,180

(22) Filed: May 8, 2002

(65) Prior Publication Data

US 2002/0167786 A1 Nov. 14, 2002

(30) Foreign Application Priority Data

May 14, 2001 (JP) ........................................ 2001-143718

(51) Int. Cl.[7] ................................................ H01G 9/04
(52) U.S. Cl. ........................ 361/510; 361/516; 361/528; 361/532
(58) Field of Search ................................ 361/508, 509, 361/516, 528, 529, 532, 533, 540; 29/25.03

(56) References Cited

U.S. PATENT DOCUMENTS 4,437,139 A * 3/1984 Howard .................. 204/192.15

FOREIGN PATENT DOCUMENTS

| JP | 64-22018 A | 1/1989 |
|----|------------|--------|
| JP | 3084895 B2 | 7/2000 |

\* cited by examiner

*Primary Examiner*—Anthony Dinkins
(74) *Attorney, Agent, or Firm*—Sughrue Mion, PLLC

(57) ABSTRACT

A chip capacitor has capacitor component 14 having anode lead 17 and sintered body 21 of a metal having a valve action in which anode lead 17 is embedded so as to project from embedding surface 21a, resin-based insulating film layer 24 containing a white pigment and disposed on the embedding surface of capacitor component 14, water-repellent layer 25 disposed on resin-based insulating film layer 24, anode terminal 12 having a portion bent into joint tongue 31, with anode lead 17 being placed on joint tongue 31, joint tongue 31 and anode lead 17 being welded to each other into anode terminal 12, and antireflection member 34 extending from a proximal end of joint tongue 31 of anode terminal 12 toward sintered body 21. When joint tongue 31 and anode lead 17 are welded to each other by a laser beam, antireflection member 34 prevents the laser beam from being reflected from the welded region.

15 Claims, 8 Drawing Sheets

CHIP CAPACITOR AND METHOD OF MANUFACTURING SAME

BACKGROUND OF THE INVENTION

1. Field of the Invention

The present invention relates to a chip capacitor and a method of manufacturing a chip capacitor.

2. Description of the Related Art

One conventional method of manufacturing a chip capacitor is closed in Japanese patent 3084895. According to the disclosed method, a capacitor component has an anode lead and a sintered body of a metal having a valve action in which the anode lead is embedded so as to project from the embedding surface, the anode lead is placed on a joint tongue bent from an anode terminal, and the joint tongue and the anode lead are welded to each other by a laser beam.

When the joint tongue and the anode lead are welded to each other by the laser beam, because the applied laser beam is reflected from the welded region or the laser beam is applied as a beam spot, the laser beam may be reflected from a region other than the welded region and applied to an irrelevant region. If the reflected laser beam is applied to the capacitor component itself other than the anode lead, then the quality of the capacitor component and hence the quality of the chip capacitor are lowered.

The capacitor component is produced as follows: shaped powdery body of a metal having a valve action with an anode lead mounted thereon is sintered into an anode body, and then a dielectric layer of oxide metal film is formed on the sintered body of the anode body. Then, a cathode conductor layer is formed on the dielectric layer, and thereafter a semiconductor layer is formed on the cathode conductor layer, whereupon the capacitor component is completed. When the semiconductor layer is formed, if the mother liquor of the semiconductor layer creeps up the anode lead to bring the semiconductor layer into contact with the anode lead, then the capacitor component suffers a large leakage current and loses desired capacitor characteristics. To avoid such a drawback, Japanese laid-open patent publication No. 64-22018 discloses a capacitor in which a water-repellent resin is applied to an embedding surface in which an anode lead of a sintered body is embedded. According to the disclosed capacitor, a reinforcing resin layer is formed on the water-repellent resin for avoiding shortcomings due to mechanical stresses caused when an anode lead of a capacitor component is welded to an anode terminal by electric resistance welding.

If the capacitor component having the water-repellent resin and the reinforcing resin layer is applied to a laser beam welding process rather than the disclosed welding process, then the reflected laser beam is applied to the water-repellent resin and the reinforcing resin layer before falling on the capacitor component itself. However, since the water-repellent resin and the reinforcing resin layer serve the respective purposes of repelling water and reinforcing the capacitor component, it is unavoidable for the reflected laser beam to adversely affect the capacitor component itself, lowering the quality of the capacitor component itself.

SUMMARY OF THE INVENTION

It is therefore an object of the present invention to provide a chip capacitor of increased quality and a method of manufacturing such a chip capacitor.

According to the present invention, there is provided a chip capacitor comprising a capacitor component having an anode lead, a sintered body of a metal having a valve action in which the anode lead is embedded so as to project from an embedding surface, and a cathode conductor layer disposed on the sintered body, an anode terminal having a portion bent into a joint tongue, the anode lead being placed on the joint tongue, the joint tongue and the anode lead being welded to each other by a laser beam into an anode terminal, and an antireflection member for preventing the laser beam from being reflected, the antireflection member extending from a proximal end of the joint tongue of the anode terminal toward the sintered body.

The capacitor component comprises a resin-based insulating film layer containing a white pigment and disposed on the embedding surface of the capacitor component, and a water-repellent layer disposed on the resin-based insulating film layer. The capacitor component may comprise a water-repellent layer containing a white pigment and disposed on the embedding surface of the capacitor component.

The white pigment is contained in the resin-based insulating film layer preferably at a proportion ranging from 1 weight % to 85 weight %. The white pigment is contained in the water-repellent layer also preferably at a proportion ranging from 1 weight % to 85 weight %.

The water-repellent layer is preferably made of fluoroplastic with silicone resin added thereto.

The silicone resin is added preferably in a proportion ranging from 1 weight % to 40 weight %.

According to the present invention, there is also provided a method of manufacturing a chip capacitor, comprising the steps of:

a) shaping a powdery body of a metal having a valve action with a press, with an anode lead being embedded in powdery body and projecting from an embedding surface thereof, and sintering the shaped powdery body into an anode body;

b) producing a capacitor component by forming a resin-based insulating film layer containing a white pigment on the embedding surface of the anode body, thereafter forming a water-repellent layer on the resin-based insulating film layer, thereafter forming an oxide film on a surface of the anode body and then forming a semiconductor layer on the anode body, and thereafter forming a cathode conductor layer on the semiconductor layer;

c) placing the anode lead on a bent joint tongue and welding the joint tongue and the anode lead with a laser beam into an anode terminal; and d) coating an upper surface of a placement plate of a cathode lead terminal with a conductive adhesive, and bonding the cathode conductor layer to the cathode lead terminal with the conductive adhesive, thus forming a cathode terminal.

According to the present invention, there is further provided a method of manufacturing a chip capacitor, comprising the steps of:

a) shaping a powdery body of a metal having a valve action with a press, with an anode lead being embedded in powdery body and projecting from an embedding surface thereof, and sintering the shaped powdery body into an anode body;

b) producing a capacitor component by forming a water-repellent layer containing a white pigment on the embedding surface of the anode body, thereafter forming an oxide film on a surface of the anode body and then forming a semiconductor layer on the anode body, and thereafter forming a cathode conductor layer on the semiconductor layer;

c) placing the anode lead on a bent joint tongue and welding the joint tongue and the anode lead with a laser beam into an anode terminal; and d) coating an upper surface of a placement plate of a cathode lead terminal with a conductive adhesive, and bonding the cathode conductor layer to the cathode lead terminal with the conductive adhesive, thus forming a cathode terminal.

The step c) includes the step of providing an antireflection member for preventing the laser beam from being reflected, so as to extend from a proximal end of the joint tongue of the anode terminal toward the anode body, before the joint tongue and the anode lead are welded.

The step c) includes the step of providing an antireflection member for preventing the laser beam from being reflected, so as to extend from a proximal end of the joint tongue of the anode terminal toward the anode body, before the joint tongue and the anode lead are welded.

The step c) includes the steps of placing applying means for applying the laser beam, in a position forward in the direction in which the joint tongue extends, and applying the laser beam from the applying means to either one of the anode lead and the joint tongue, and blocking the laser beam with a shield member disposed between the applying means and the capacitor component and extending from a proximal end of the joint tongue of the anode terminal toward the anode body.

With the chip capacitor according to the present invention, the antireflection member for preventing the laser beam from being reflected extends from a proximal end of the joint tongue of the anode terminal toward the sintered body. When the joint tongue and the anode lead are welded to each other by a laser beam, the antireflection member prevents the laser beam which is not applied to the welded region, but is applied from the proximal end of the joint tongue of the anode terminal toward the sintered body, from being reflected. Therefore, the quality of the component body of the capacitor component is prevented from being lowered, making the chip capacitor higher in quality.

The resin-based insulating film layer containing the white pigment is disposed on the embedding surface of the anode lead of the sintered body, and the water-repellent layer is disposed on the resin-based insulating film layer. When the joint tongue and the anode lead are welded to each other by a laser beam, the resin-based insulating film layer containing the white pigment reflects a reflection of the laser beam from the welded region and blocks the reflection of the laser beam applied to the sintered body. Therefore, the quality of the component body including the sintered body is prevented from being lowered, making the chip capacitor higher in quality.

Since the water-repellent layer deposited on the resin-based insulating film layer which contains the white pigment serves as an outer surface, when the semiconductor layer is formed, the semiconductor mother liquor is reliably prevented by the water-repellent layer from creeping up the anode lead, thus reliably preventing the leakage current from increasing and the capacitor characteristics from being degraded. With the capacitor component protected against damage by being reinforced by the inner resin-based insulating film layer, the resin-based insulating film layer containing the white pigment and the water-repellent layer are successively formed on the embedding surface of the sintered body, so that the efficiency of the manufacturing operation can be increased and the production facility can easily be automatized.

If the water-repellent layer containing the white pigment is disposed on the embedding surface of the anode lead of the anode body, the quality of the component body including the sintered body is prevented from being lowered, making the chip capacitor higher in quality.

Since the proportion of the white pigment in the resin-based insulating film layer is in the range from 1 weight % to 85 weight %, when the joint tongue and the anode lead are welded to each other by the laser beam, a reflection of the laser beam from the welded region is reliably reflected by the layer containing the white pigment against being applied to the sintered body. Therefore, the quality of the component body including the sintered body is reliably prevented from being lowered, making the chip capacitor higher in quality.

Because the water-repellent layer is preferably made of fluoroplastic with silicone resin added thereto, its wettability is lowered. When the water-repellent layer is applied, therefore, it stays in the applied region and clearly indicates its presence. Specifically, if the water-repellent layer is made of fluoroplastic only, its wettability is so high that it does not stay in the applied region and the applied region cannot easily be identified. The present invention is effective to solve these problems. Further, as the added amount of silicone resin in water-repellent layer is in the range from 1 weight % to 40 weight %, the wettability of water-repellent layer is reliably low. When water-repellent layer is applied, it stays well in the applied region and clearly indicates its presence.

In the method of manufacturing a chip capacitor according to the present invention, the capacitor component is produced by forming a resin-based insulating film layer containing a white pigment on the embedding surface of the anode body, and thereafter, forming a water-repellent layer on the resin-based insulating film layer. The anode lead is placed on the joint tongue and the joint tongue and the anode lead are welded by a laser beam into an anode terminal. When the joint tongue and the anode lead are welded, the resin-based insulating film layer containing the white pigment reflects a reflection of the laser beam from the welded region, and prevents the reflection from being applied to the sintered body. Therefore, the quality of the component body including the sintered body is reliably prevented from being lowered, making the chip capacitor higher in quality.

When a semiconductor layer is formed after the resin-based insulating film layer and the water-repellent layer are formed, since the water-repellent layer has been formed on the resin-based insulating film layer containing the white pigment, the water-repellent layer serves as an outer surface, preventing the semiconductor mother liquor from creeping up the anode lead, thus reliably preventing the leakage current from increasing and the capacitor characteristics from being degraded. With the leakage current prevented from increasing and the capacitor characteristics prevented from being degraded and the capacitor component protected against damage by being reinforced by the inner resin-based insulating film layer, the resin-based insulating film layer and the water-repellent layer are successively deposited on the same embedding surface of the anode lead of the sintered body, so that the efficiency of the manufacturing operation can be increased and the production facility can easily be automatized.

In the above method, the antireflection member for preventing the laser beam from being reflected extends from the proximal end of the joint tongue of the anode terminal toward the sintered body. When the joint tongue and the anode lead are welded to each other by a laser beam applied from the area forward of the tip end of the joint tongue, the antireflection member prevents the laser beam which is applied from the proximal end of the joint tongue of the anode terminal toward the sintered body, from being reflected. Therefore, the reflection from the proximal end of the joint tongue of the anode terminal toward the sintered body is prevented from being applied to the component body including the sintered body. Therefore, the quality of the component body is reliably prevented from being lowered, making the chip capacitor higher in quality.

The shield member for blocking the laser beam applied from the proximal end of the joint tongue of the anode terminal toward the sintered body is disposed between the applying means and the capacitor component. The shield member blocks the laser beam from the area forward of the tip end of the joint tongue, which is not applied to the welded region, but applied from the proximal end of the joint tongue of the anode terminal toward the sintered body. The shield member thus prevents a reflection from this region from being applied to the component body including the sintered body. Consequently, the quality of the component body is reliably prevented from being lowered, making the chip capacitor higher in quality.

The above and other objects, features, and advantages of the present invention will become apparent from the following description based on the accompanying drawings, which illustrate examples of preferred embodiments of the present invention.

DESCRIPTION OF THE PREFERRED EMBODIMENTS

Figure 1:
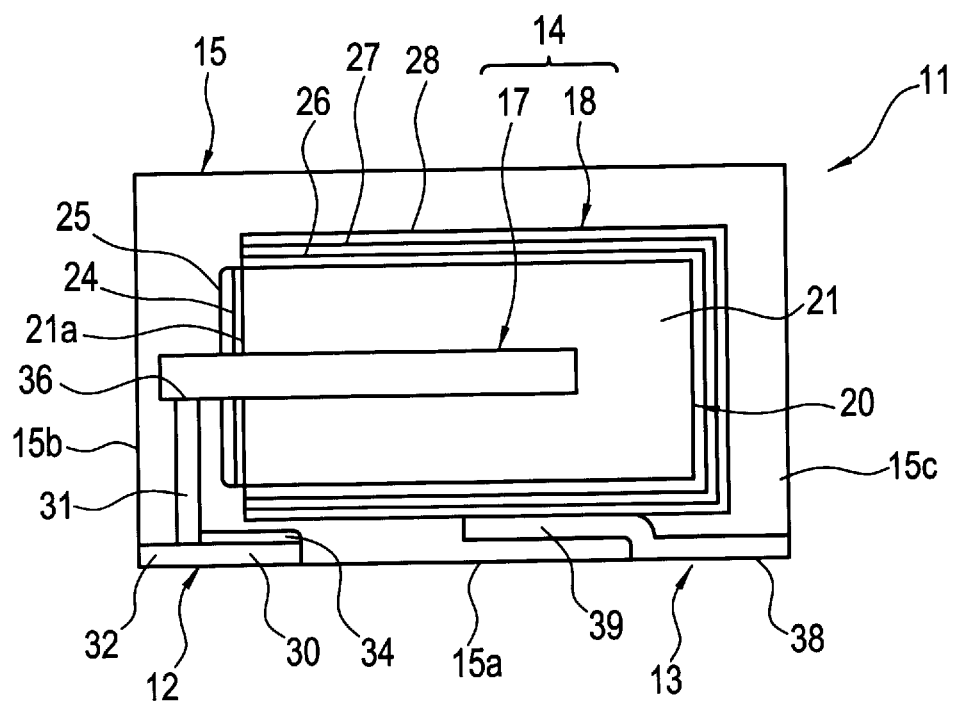
FIG. 1 is a sectional side elevational view of a chip capacitor according to an embodiment of the present invention.
Figure 2:
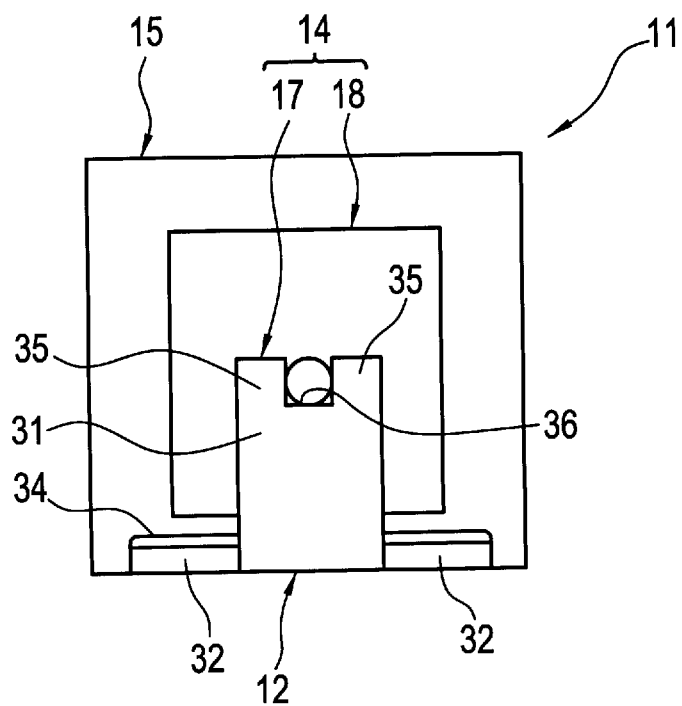
FIG. 2 is a front elevational view of the chip capacitor according to the embodiment of the present invention, with an outer casing being shown as transparent.
Figure 3:
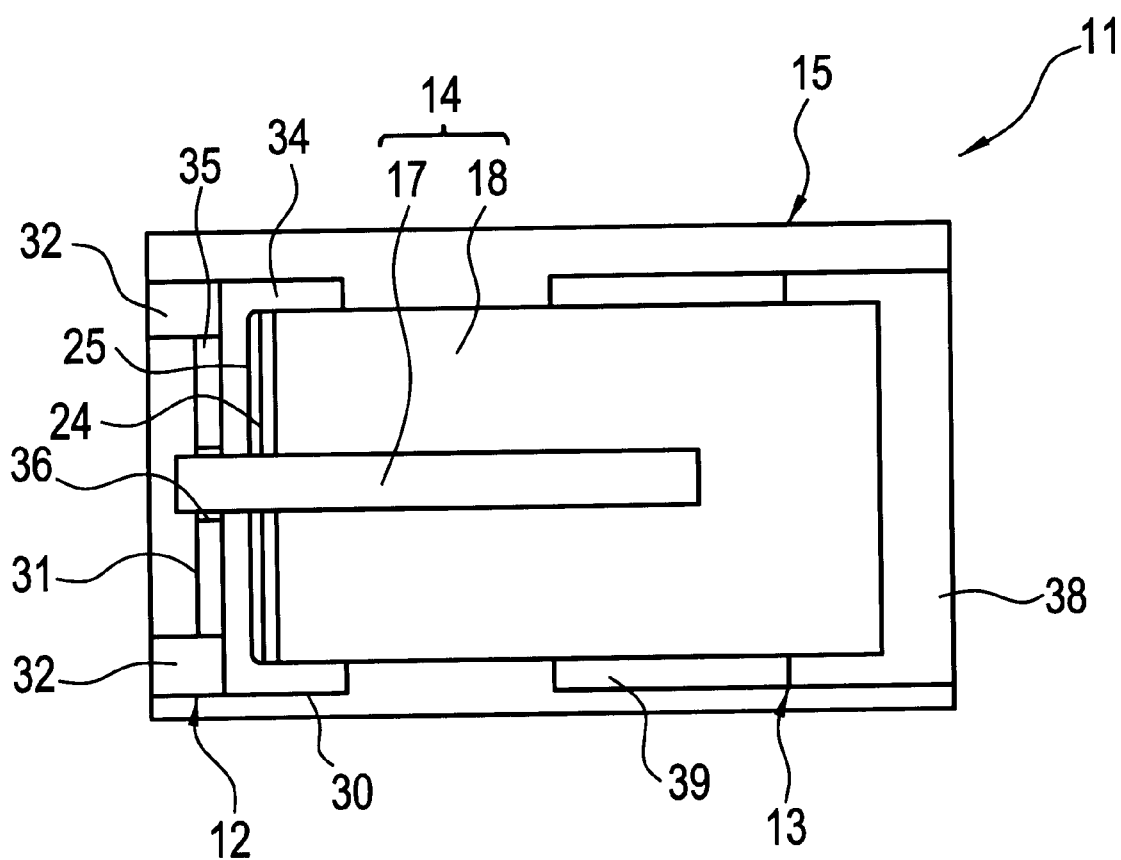
FIG. 3 is a plan view of the chip capacitor according to the embodiment of the present invention, with the outer casing being shown as transparent.

As shown in FIGS. 1 through 3, chip capacitor (solid-state electrolytic chip capacitor) 11 according to an embodiment of the present invention comprises anode terminal 12, cathode terminal 13, capacitor component 14 connected to anode terminal 12 and cathode terminal 13, and resin outer casing 15 which encases anode terminal 12, cathode terminal 13, and capacitor component 14.

Capacitor component 14 has rod-shaped anode lead 17 in the form of a tantalum wire and component body 18 in the shape of a rectangular parallelepiped with anode lead 17 embedded therein which extends from the center of component body 18 and projects outwardly from one side of component body 18.

Capacitor component 14 has anode body 20 which is produced by forming, with a press, a shaped powdery body of a metal having a valve action such as tantalum or the like, of which component body 18 is primarily made, with anode lead 17 mounted therein, and sintering the shaped powdery body in a high vacuum and at a high temperature. Anode body 20 is constructed of anode lead 17 and sintered body 21 made of a metal having a valve action.

Resin-based insulating film layer 24 containing a white pigment is deposited to a thickness ranging from 5 $\mu$m to 20 $\mu$m on entire embedding surface 21a of sintered body 21 where anode lead 17 projects, and water-repellent layer 25 is deposited on the entire surface of resin-based insulating film layer 24. Dielectric film 26 comprising an oxide film of tantalum pentoxide or the like is deposited on the entire surface of sintered body 21 except embedding surface 21a, and semiconductor layer 27 comprising a conductive polymeric layer is deposited on the entire outer surface of dielectric film 26. Cathode conductor layer 28 is deposited on the entire outer surface of semiconductor layer 27.

Resin-based insulating film layer 24 is made of a resin material which comprises at least one material selected from polybutadiene-type resin, epoxy resin, polyimide, phenoxy resin, bismaleimide resin, acrylic resin, and phenolic resin. For example, resin-based insulating film layer 24 is made of an ultraviolet curable resin.

The white pigment contained in resin-based insulating film layer 24 comprises at least one material selected from titanium oxide, zinc oxide, basic lead carbonate, barium sulfate, zinc sulfide, basic lead sulfate, antimony oxide, silica, and alumina, and is kneaded and adjusted with the above resin component. The proportion of the white pigment in the resin-based insulating film layer is in the range from 1 weight % to 85 weight %.

Water-repellent layer 25 is made of at least ether one of silicone resin and fluoroplastic. Preferably, water-repellent layer 25 is made of fluoroplastic with silicone resin added thereto. The added amount of silicone resin in water-repellent layer 25 is in the range from 1 weight % to 40 weight %. The resin material of water-repellent layer 25 should preferably be an ultraviolet curable resin for preventing itself from seeping into the capacitor component.

Resin outer casing 15 is made of epoxy resin or the like and is substantially in the shape of a rectangular parallelepiped. Resin outer casing 15 has mounting surface 15a, which is shown as a lower surface in FIG. 1, placed and mounted on a printed-circuit board (not shown).

Anode terminal 12 comprises a pressed flat plate of uniform thickness which is made of an alloy of nickel and iron (42% of nickel) and plated with solder. Anode terminal 12 is positioned near mounting surface 15a and mounted on outer end surface 15b of resin outer casing 15 in the longitudinal direction of the capacitor (the horizontal direction in FIG. 1). Anode terminal 12 comprises bottom plate 30 exposed on mounting surface 15a and having an intermediate portion raised in the transverse direction of the capacitor (the direction normal to the sheet of FIG. 1). Anode terminal 12 has joint tongue 31 connected to anode lead 17 of capacitor component 14 and a pair of side members 32 extending from opposite positions, in the transverse direction of the capacitor, outside of joint tongue 31 that is raised from bottom plate 30, in opposite directions away from joint tongue 31.

Black antireflection member 34 for preventing a laser beam from being reflected is mounted on anode terminal 12 and extends from the proximal end of joint tongue 31 toward component body 18, i.e., sintered body 21, or specifically to a deeper position beyond embedding surface 21a of component body 18. Antireflection member 34 is coated or applied in a given range at a given position before anode terminal 12 is pressed to shape, and placed in the above position after anode terminal 12 is pressed. Antireflection member 34 is made of an insulating material which is at least one of epoxy resin, polyimide, polyethylene, and polypropylene.

As shown in FIG. 2, anode terminal 12 has a pair of upwardly projecting welding protrusions 35 on opposite ends in the transverse direction of the capacitor (the horizontal direction in FIG. 2) of an upper portion thereof which is remote from bottom plate 30 and side members 32 of joint tongue 31. Anode terminal 12 has welding recess 36 defined between welding protrusions 35.

Anode lead 17 of capacitor component 14 is placed in welding recess 36 and welded to joint tongue 31 by a laser beam welding process. Joint tongue 31 may not be of the above recessed shape, but may be of an L shape having single welding protrusion 35.

Cathode terminal 13 comprises a pressed flat plate of uniform thickness which is made of an alloy of nickel and iron and plated with solder. Cathode terminal 13 is positioned near mounting surface 15a and mounted on other outer end surface 15c of resin outer casing 15 in the longitudinal direction of the capacitor (the horizontal direction in FIG. 1). Cathode terminal 13 comprises bottom plate 38 exposed on mounting surface 15a and placement plate 39 disposed above and extending parallel to bottom plate 38. Placement plate 39 serves to place thereon the outer circumferential surface of component body 18 of capacitor component 14. Bottom plate 38 and placement plate 39 are coated with a conductive adhesive (not shown) such as a silver paste or the like, by which component body 18 of capacitor component 14 is bonded to cathode terminal 13.

A process of manufacturing chip capacitor 11 will be described below.

Figure 4:
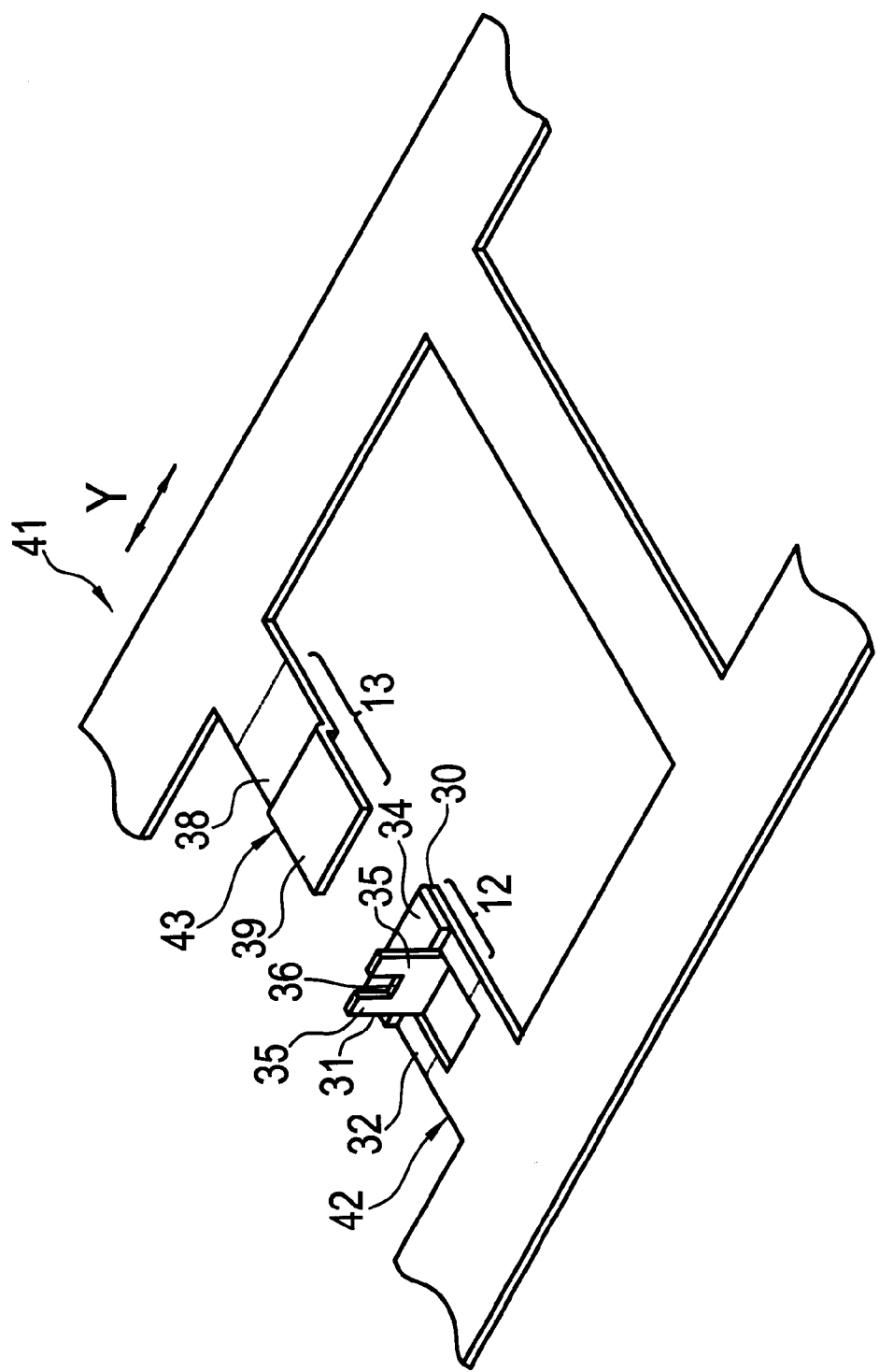
FIG. 4 a perspective view of a lead frame of the chip capacitor according to the embodiment of the present invention.

As shown in FIG. 4, a pair of anode lead terminals 42 and cathode lead terminal 43 is formed in confronting relation to each other on flat lead frame 41 plated with solder, by pressing. At this time, joint tongue 31 having welding protrusions 35 and welding recess 36 is raised from and bottom plate 30 and side members 32 are formed on a portion of anode lead terminal 42 near cathode lead terminal 43, by blanking and bending. Bottom plate 38 and placement plate 39 of cathode terminal 13 are formed on a portion of cathode lead terminal 43 near anode lead terminal 42. Before pressing, antireflection member 34 is applied in a given range at a given position. After pressing, antireflection member 34 is disposed so as to extend from the proximal end of joint tongue 31 on bottom plate 30 of anode lead terminal 42 toward component body 18, i.e., cathode lead terminal 43. More specifically, a welding process to be described later on is preceded by an antireflection member applying process for providing antireflection member 34 for preventing a laser beam from being reflected, so as to extend from the proximal end of joint tongue 31 on anode lead terminal 42 toward component body 18. Bottom plate 30 of anode lead terminal 42 and bottom plate 38 of cathode lead terminal 13 are finally shaped when anode lead terminal 42 and cathode lead terminal 43 are subsequently cut off along cutting lines which are shown as the two-dot-and-dash lines in FIG. 4, 12, and 13.

Anode lead terminal 42 and cathode lead terminal 43, which confront each other, of lead frame 41 serve to form anode terminal 12 and cathode terminal 13 of one chip capacitor 11. Although not shown, lead frame 41 has a plurality of pairs of anode lead terminals 42 and cathode lead terminals 43 arranged in a juxtaposed fashion in the transverse directions of capacitors (the Y direction in FIG. 4).

Capacitor component 14 is produced separately from the above process.

Figure 5:
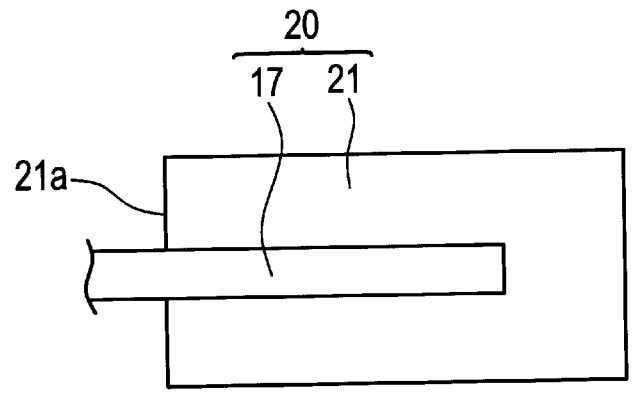
FIG. 5 is a sectional side elevational view showing a stage after an anode body of a capacitor component is formed in a process of manufacturing the chip capacitor according to the embodiment of the present invention.
Figure 6:
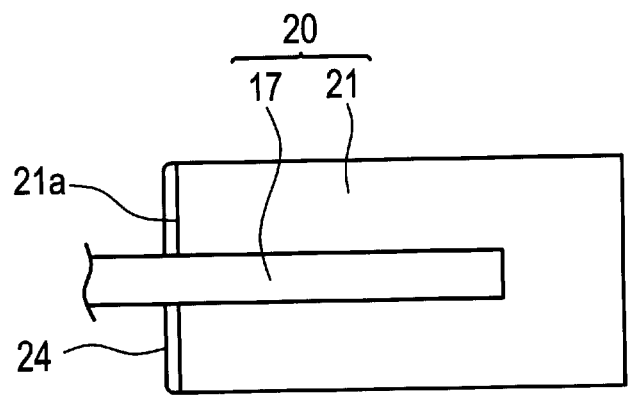
FIG. 6 is a sectional side elevational view showing a stage after a resin-based insulating film layer of the capacitor component is formed in the process of manufacturing the chip capacitor according to the embodiment of the present invention.
Figure 7:
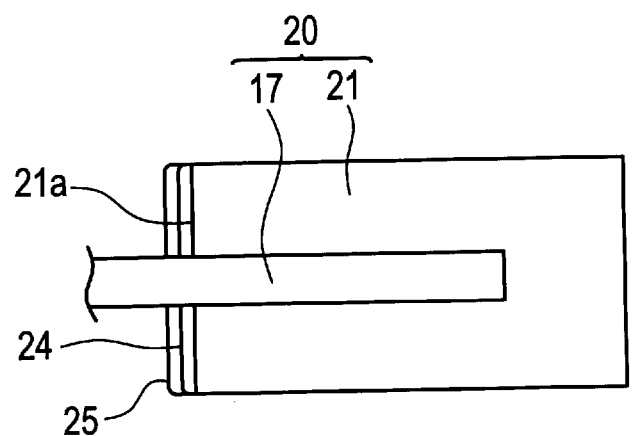
FIG. 7 is a sectional side elevational view showing a stage after a water-repellent layer of the capacitor component is formed in the process of manufacturing the chip capacitor according to the embodiment of the present invention.
Figure 8:
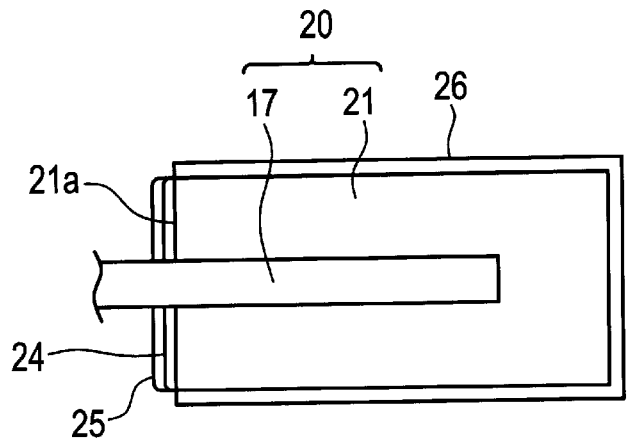
FIG. 8 is a sectional side elevational view showing a stage after a dielectric film of the capacitor component is formed in the process of manufacturing the chip capacitor according to the embodiment of the present invention.

Capacitor component 14 is produced through an anode body forming process (see FIG. 5) in which a powdery body of a metal having a valve action, such as tantalum or the like, which principally makes up component body 18, is shaped by a press while anode lead 17 is being mounted, and the shaped powdery body is sintered into anode body 20 in a high vacuum and at a high temperature, a resin-based insulating film layer forming process (see FIG. 6) in which resin-based insulating film layer 24 containing a white pigment is formed on embedding surface 21a, where anode lead 17 is mounted, of sintered body 21 of anode body 20, a water-repellent layer forming process (see FIG. 7) in which water-repellent layer 25 is deposited on resin-based insulating film layer 24 after the resin-based insulating film layer forming process, and a dielectric film forming process (see FIG. 8) in which dielectric film 26 comprising an oxide film of tantalum pentoxide or the like is deposited on the surface of anode body after the water-repellent layer forming process.

Figure 9:
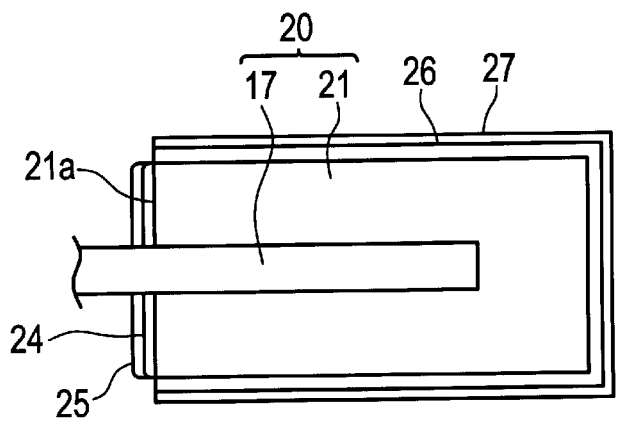
FIG. 9 is a sectional side elevational view showing a stage after a semiconductor layer of the capacitor component is formed in the process of manufacturing the chip capacitor according to the embodiment of the present invention.
Figure 10:
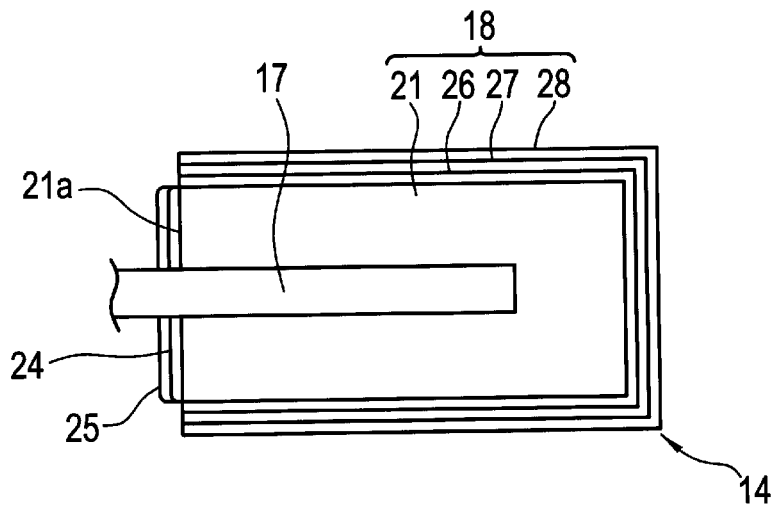
FIG. 10 is a sectional side elevational view showing a stage after a cathode conductor layer of the capacitor component is formed in the process of manufacturing the chip capacitor according to the embodiment of the present invention.

Furthermore, capacitor component 14 is produced through a semiconductor layer forming process (see FIG. 9) in which semiconductor layer 27 made of a conductive polymer such as polypyrrole, polyaniline, or the like is deposited on anode body 20 after the dielectric film forming process, i.e., after the water-repellent layer forming process, and a cathode conductor layer forming process (see FIG. 10) in which cathode conductor layer 28 such as a silver paste or the like is deposited on semiconductor layer 27 after the semiconductor layer forming process.

Figure 11:
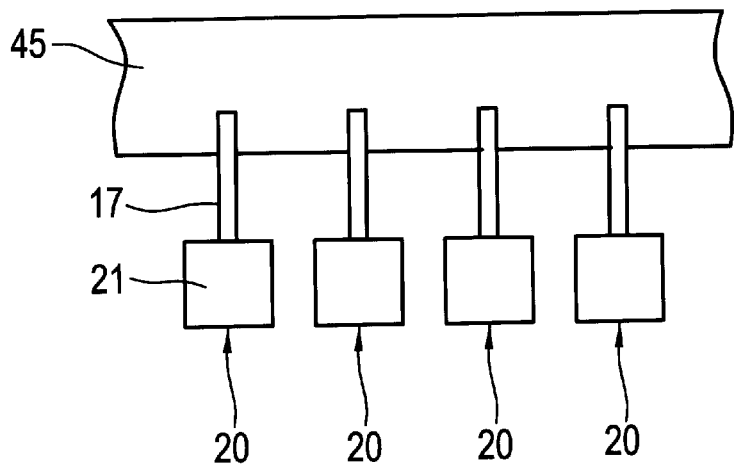
FIG. 11 is a sectional side elevational view showing a stage in which a number of anode bodies are connected to a holder after each anode body of the capacitor component is formed in the process of manufacturing the chip capacitor according to the embodiment of the present invention.

After the anode body forming process, as shown in FIG. 11, a number of anode bodies 20 are welded by respective anode leads 17 to a holder 45 made of aluminum or the like such that sintered bodies 21 are positioned downwardly. Anode bodies 20 thus coupled to holder 45 are dipped in a dielectric mother liquor for forming dielectric films 26, whereupon oxide films of tantalum pentoxide or the like are simultaneously deposited as dielectric films 26 on the respective surfaces of anode bodies 20 in the dielectric film forming process. Then, in the semiconductor layer forming process, the anode bodies 20 are dipped in a semiconductor mother liquor for forming semiconductor layers 27, whereupon semiconductor layers 27 are simultaneously deposited on the respective surfaces of anode bodies 20. Thereafter, in the cathode conductor layer forming process, the anode bodies 20 are dipped in a conductor mother liquor for forming cathode conductor layers, whereupon cathode conductor layers 28 are deposited on the respective surfaces of anode bodies 20.

When anode bodies 20 are welded to holder 45 as described above, respective anode leads 17 of anode bodies 20 are gripped by a welding machine. At this time, mounting surfaces 21a are coated with resin-based insulating film layers 24 from the side of the welding machine, and then resin-based insulating film layers 24 are cured by ultraviolet radiation in the resin-based insulating film layer forming process. Thereafter, water-repellent layers 25 are applied to resin-based insulating film layers 24 and cured by ultraviolet radiation in the water-repellent layer forming process. Since resin-based insulating film layers 24 and water-repellent layers 25 are formed when anode bodies 20 are welded to holder 45, the dielectric film forming process is carried out after the water-repellent layer forming process. If resin-based insulating film layers 24 and water-repellent layers 25 are not formed as described above, then the dielectric film forming process may be carried out anytime after the anode body forming process and before the semiconductor layer forming process. For example, the dielectric film forming process may be carried out immediately prior to the resin-based insulating film layer forming process or after the resin-based insulating film layer forming process and before the water-repellent layer forming process. In the resin-based insulating film layer forming process, the resin-based insulating film layer may be applied by a dipping process, a process using a dispenser, or other processes.

In the semiconductor layer forming process, because water-repellent layer 25 has already been formed on the entire outer surface of embedding surface 21a of sintered body 21, the semiconductor mother liquor does not creep up anode lead 17 when sintered body 21 of anode body 20 is dipped in the semiconductor mother liquor, thus preventing an LC characteristic degradation or a short circuit which would otherwise be caused by contact between anode lead 17 and semiconductor layer 27. While semiconductor layer 27 may be formed of manganese dioxide, a water-repellent layer containing a heat-resistant white pigment should be used because manganese dioxide needs to be heat-treated at a high temperature. If semiconductor layer 27 is formed of a conductive polymer, then a resin-based insulating film layer containing a white pigment is used as a conductive polymer does not need to be heat-treated at a high temperature.

Capacitor component 14 thus produced by the anode body forming process, the resin-based insulating film layer forming process, the water-repellent layer forming process, the dielectric film forming process, the semiconductor layer forming process, and the cathode conductor layer forming process is severed the holder 45, placed on lead frame 41, and welded thereby by a laser beam welding process.

Figure 12:
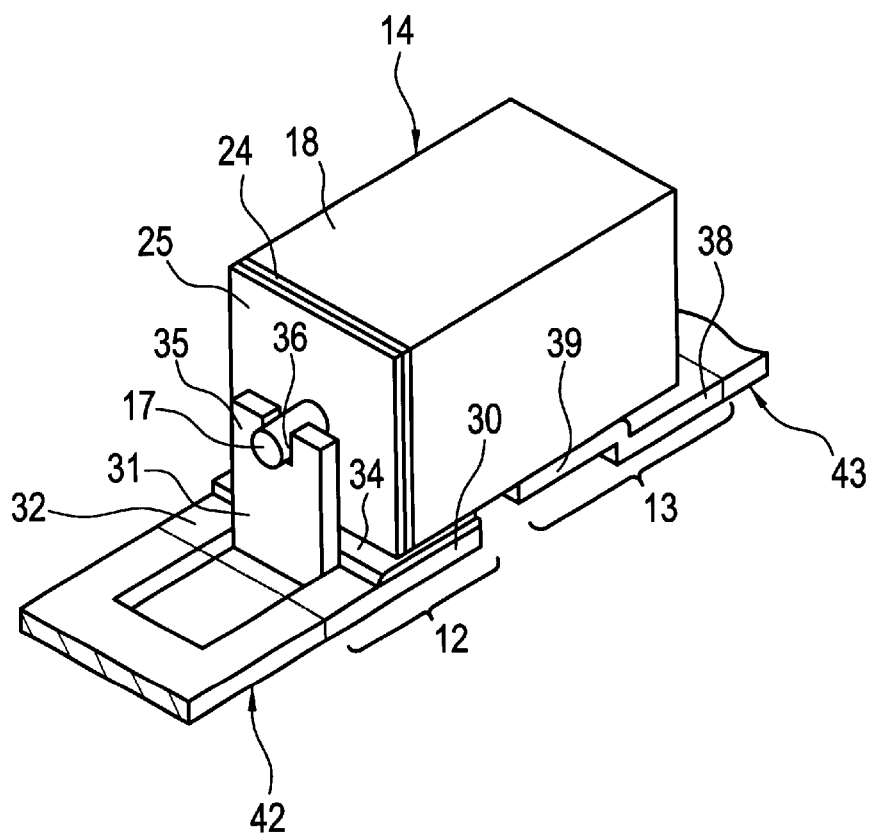
FIG. 12 is a perspective view of a capacitor component placed on the lead frame of the chip capacitor according to the embodiment of the present invention.

As shown in FIG. 12, capacitor component 14 is connected to anode lead terminal 12 and cathode lead terminal 43 of lead frame 41. Specifically, the upper surfaces of bottom plate 38 and placement plate 39 of cathode lead terminal 43 are coated with a conductive adhesive such as a silver paste or the like, and component body 18 of capacitor component 14 is dried and bonded to cathode lead terminal 43 by the conductive adhesive after the laser beam welding process.

Figure 13:
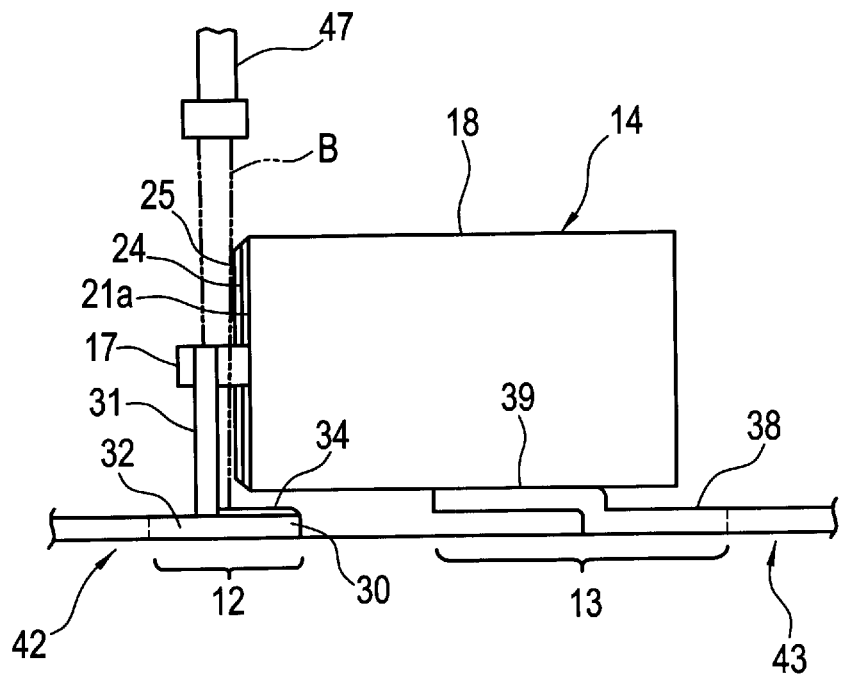
FIG. 13 is a side elevational view illustrative of a welding step in the process of manufacturing the chip capacitor according to the embodiment of the present invention.

Anode lead 17 of capacitor component 14 is placed in welding recess 36 in joint tongue 31 of anode lead terminal 42, and joint tongue 31 and anode lead 17 are welded to each other by a laser beam. Specifically, as shown in FIG. 13, a laser beam welding machine such as a YAG laser beam welding machine or the like has laser beam emitter (applying means) 47 for emitting laser beam B forwardly in the direction in which joint tongue 31 extends, i.e., above joint tongue 31. Laser beam emitter 47 applies laser beam B from a position forward in the direction in which joint tongue 31 extends, i.e., above joint tongue 31, as a spot on either joint tongue 31 or anode lead 17.

In this welding process, since resin-based insulating film layer 24 containing the white pigment has already been coated on embedding surface 21a, where anode lead 17 is mounted, of sintered body 21, and water-repellent layer 25 has already been deposited resin-based insulating film layer 24, a reflection of laser beam B directed from the welded region toward capacitor component 14 passes through water-repellent layer 25, but is reflected by resin-based insulating film layer 24 containing the white pigment, and hence is prevented from being applied to sintered body 21.

Moreover, inasmuch as antireflection member 34 for preventing laser beam B from being reflected extends from the proximal end of joint tongue 31 of anode lead terminal 42 (anode terminal 12) toward component body 18, laser beam B which is not applied to the welded region, but applied from the proximal end of joint tongue 31 of anode lead terminal 42 toward component body 18, is prevented from being reflected by antireflection member 34. Accordingly, a reflection is prevented from being generated in this region, and prevented from being applied to component body 18.

Thereafter, though not shown, the area where anode lead terminal 42 and cathode lead terminal 43 confront each other, i.e., the area including joint tongue 31, side members 32, and bottom plate 30 of anode lead terminal 42, the area including bottom plate 38 and placement plate 39 of cathode lead terminal 43, and capacitor component 14 connected to cathode lead terminal 43 and anode lead terminal 42 are integrally encased by resin outer casing 15. The assembly is then cut off into chip capacitor 11.

In the present embodiment described above, the capacitor component 14 is produced through the resin-based insulating film layer forming process in which resin-based insulating film layer 24 containing a white pigment is formed on embedding surface 21a, where anode lead 17 is mounted, of component body 18, i.e., sintered body 21 of anode body 20, and thereafter the water-repellent layer forming process in which water-repellent layer 25 is deposited on resin-based insulating film layer 24 after the resin-based insulating film layer forming process. Therefore, in capacitor component 14 thus produced, resin-based insulating film layer 24 containing the white pigment is deposited on the entire surface of embedding surface 21a of sintered body 21, and water-repellent layer 25 is deposited on resin-based insulating film layer 24. When anode lead 17 of capacitor component 14 is placed on joint tongue 31 of anode terminal 12 and joint tongue 31 and anode lead 17 are welded to each other by laser beam B, a reflection of laser beam B from the welded region is reflected by resin-based insulating film layer 24 containing the white pigment and is prevented from being applied to component body 18.

Since water-repellent layer 25 is deposited on resin-based insulating film layer 24 which contains the white pigment and serves as an outer surface, when semiconductor layer 27 is formed after the resin-based insulating film layer forming process in which resin-based insulating film layer 24 containing a white pigment is deposited and the water-repellent layer forming process in which water-repellent layer 25 is deposited are successively carried out on same embedding surface 21a, the semiconductor mother liquor is reliably prevented by water-repellent layer 25 from creeping up anode lead 17, thus reliably preventing the leakage current from increasing and the capacitor characteristics from being degraded. With the leakage current prevented from increasing and the capacitor characteristics prevented from being degraded and capacitor component 14 protected against damage by being reinforced by inner resin-based insulating film layer 24, the resin-based insulating film layer forming process in which resin-based insulating film layer 24 containing a white pigment is deposited and the water-repellent layer forming process in which water-repellent layer 25 is deposited are successively carried out on same embedding surface 21a, so that the efficiency of the manufacturing operation can be increased and the production facility can easily be automatized.

Specifically, if the resin layer were formed on the water-repellent layer, then the anode body forming process, the water-repellent layer forming process, the dielectric film forming process, the semiconductor layer forming process, the cathode conductor layer forming process, and the resin layer forming process would be carried out in the order named, and processes of forming a plurality of layers on same embedding surface 21a would be separated. In the above embodiment, however, the anode body forming process, the resin-based insulating film layer forming process, the water-repellent layer forming process, the dielectric film forming process, the semiconductor layer forming process, and the cathode conductor layer forming process are carried out in the order named, and the process of depositing resin-based insulating film layer 24 containing a white pigment and the process of depositing water-repellent layer 24 can successively be deposited on same embedding surface 21a, so that the efficiency of the manufacturing operation can be increased and the production facility can easily be automatized.

After the antireflection member applying process in which antireflection member 34 for preventing laser beam B from being reflected is applied so as to extend from the proximal end of joint tongue 31 of anode lead 12 toward component body 18, joint tongue 31 and anode lead 17 are welded to each other by the laser beam B which is applied from the region where the tip end of joint tongue 31 extends. When joint tongue 31 and anode lead 17 are welded to each other, antireflection member 34 for preventing laser beam B from being reflected has already been applied so as to extend from the proximal end of joint tongue 31 of anode lead 12 toward component body 18, and prevents laser beam B from being reflected which is not applied to the welded region, but applied from the proximal end of joint tongue 31 of anode lead 12 toward component body 18. Accordingly, a reflection from this region is prevented from being applied to component body 18.

Therefore, the quality of component body 18 is reliably prevented from being lowered, allowing chip capacitor 11 of higher quality to be manufactured.

If resin-based insulating film layer 24 is made of polybutadiene-type resin, then it suffers less yellowing, is less susceptible to damage from a reflection of the welding laser beam, has excellent heat resistance and electric characteristics, is effective to reinforce the proximal end of anode lead 17, prevents stresses from being developed in sintered body 21, and produces good results from soldering heat resistance and heat impact tests. If resin-based insulating film layer 24 is made of ultraviolet curable resin, then it can quickly be cured after being applied and hence is prevented from seeping into sintered body 21.

If the white pigment comprises titanium oxide, then since it has a high reflectance with respect to light at a wavelength of 1.06 $\mu$m which is the same as a YAG laser beam used in the welding process, it is capable of effectively preventing damage to component body 18 and has excellent heat resistance and electric characteristics.

In the present embodiment, since the proportion of the white pigment in resin-based insulating film layer 24 is in the range from 1 weight % to 85 weight %, when anode lead 17 of capacitor component 14 is placed on joint tongue 31 of anode terminal 12 and joint tongue 31 and anode lead 17 are welded to each other by laser beam B, a reflection of laser beam B from the welded region is reliably reflected by the layer containing the white pigment against being applied to sintered body 21. Therefore, the quality of component body 18 including sintered body 21 is reliably prevented from being lowered, making it possible to produce chip capacitor 11 of higher quality.

If the proportion of the white pigment were less than 1 weight %, then it would have almost no effect to reflect a reflection of the laser beam in the laser beam welding process. If the proportion of the white pigment were in excess of 85 weight %, then the adhesion and flowability of resin-based insulating film layer 24 would be reduced at the time of its application, and resin-based insulating film layer 24 would not be applied well. It is possible to add a solvent, a thixotropic agent, or the like to resin-based insulating film layer 24 for improving the applicability thereof and the efficiency with which to apply resin-based insulating film layer 24.

In the present embodiment, furthermore, because water-repellent layer 25 is preferably made of fluoroplastic with silicone resin added thereto, its wettability is lowered. When water-repellent layer 25 is applied, therefore, it stays in the applied region and clearly indicates its presence. Specifically, if water-repellent layer 25 is made of fluoroplastic only, its wettability is so high that it does not stay in the applied region and the applied region cannot easily be identified. The present invention is effective to solve these problems.

As the added amount of silicone resin in water-repellent layer 25 is in the range from 1 weight % to 40 weight %, the wettability of water-repellent layer 25 is reliably low. When water-repellent layer 25 is applied, it stays well in the applied region and clearly indicates its presence. Specifically, if the added amount of silicone resin were less than 1 weight %, then it would have almost no effect to lower the wettability. If the added amount of silicone resin were in excess of 40 weight %, its wettability would be too low to apply water-repellent layer 25 efficiently.

The above embodiment may be modified as follows:

[Modification 1]

The antireflection member applying process in which antireflection member 34 for preventing laser beam B from being reflected is applied so as to extend from the proximal end of joint tongue 31 of anode lead 12 toward component body 18 is not carried out, and the resin-based insulating film layer forming process in which resin-based insulating film layer 24 containing a white pigment is formed on embedding surface 21a of sintered body 21, and the water-repellent layer forming process in which water-repellent layer 25 is deposited on resin-based insulating film layer 24 after the resin-based insulating film layer forming process are carried out. Specifically, antireflection member 34 is not deposited on anode terminal 12, but resin-based insulating film layer 24 containing a white pigment and water-repellent layer 25 are deposited on embedding surface 21a of sintered body 21. This modification is also capable of preventing the quality of component body 18 from being lowered, making it possible to produce high-quality of chip capacitor 11.

[Modification 2]

The resin-based insulating film layer forming process in which resin-based insulating film layer 24 containing a white pigment is formed on embedding surface 21a of sintered body 21 is not carried out, and the antireflection member applying process in which antireflection member 34 for preventing laser beam B from being reflected is applied so as to extend from the proximal end of joint tongue 31 of anode lead 12 toward component body 18 is carried out. Specifically, resin-based insulating film layer 24 containing a white pigment is not formed on embedding surface 21a of sintered body 21, but only water-repellent layer 25 is deposited on embedding surface 21a and antireflection member 34 is disposed on anode terminal 12. This modification is also capable of preventing the quality of component body 18 from being lowered, making it possible to produce high-quality of chip capacitor 11.

[Modification 3]

Figure 14:
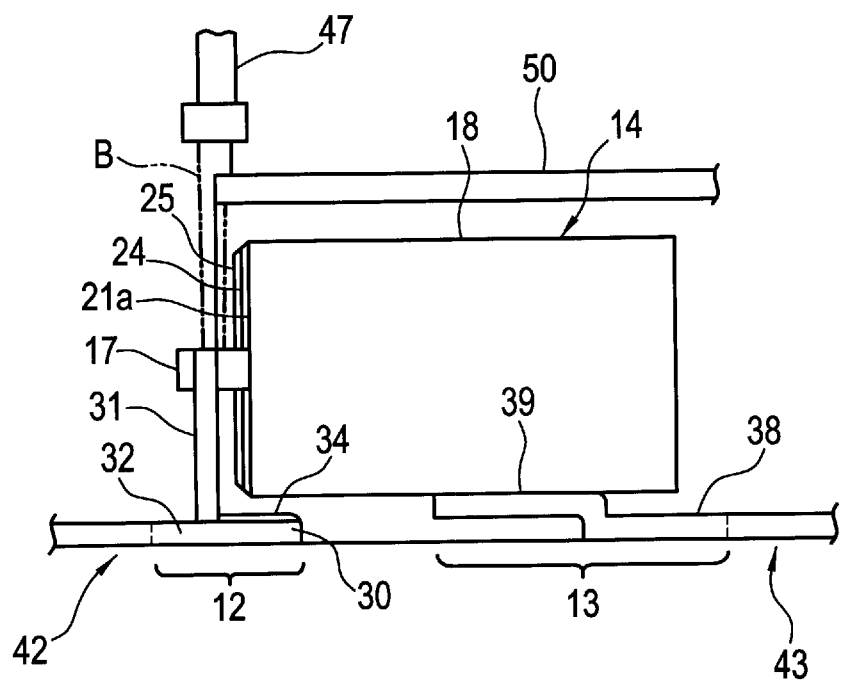
FIG. 14 is a side elevational view illustrative of a welding step according to a modification 3 in the process of manufacturing the chip capacitor according to the embodiment of the present invention.
Figure 15:
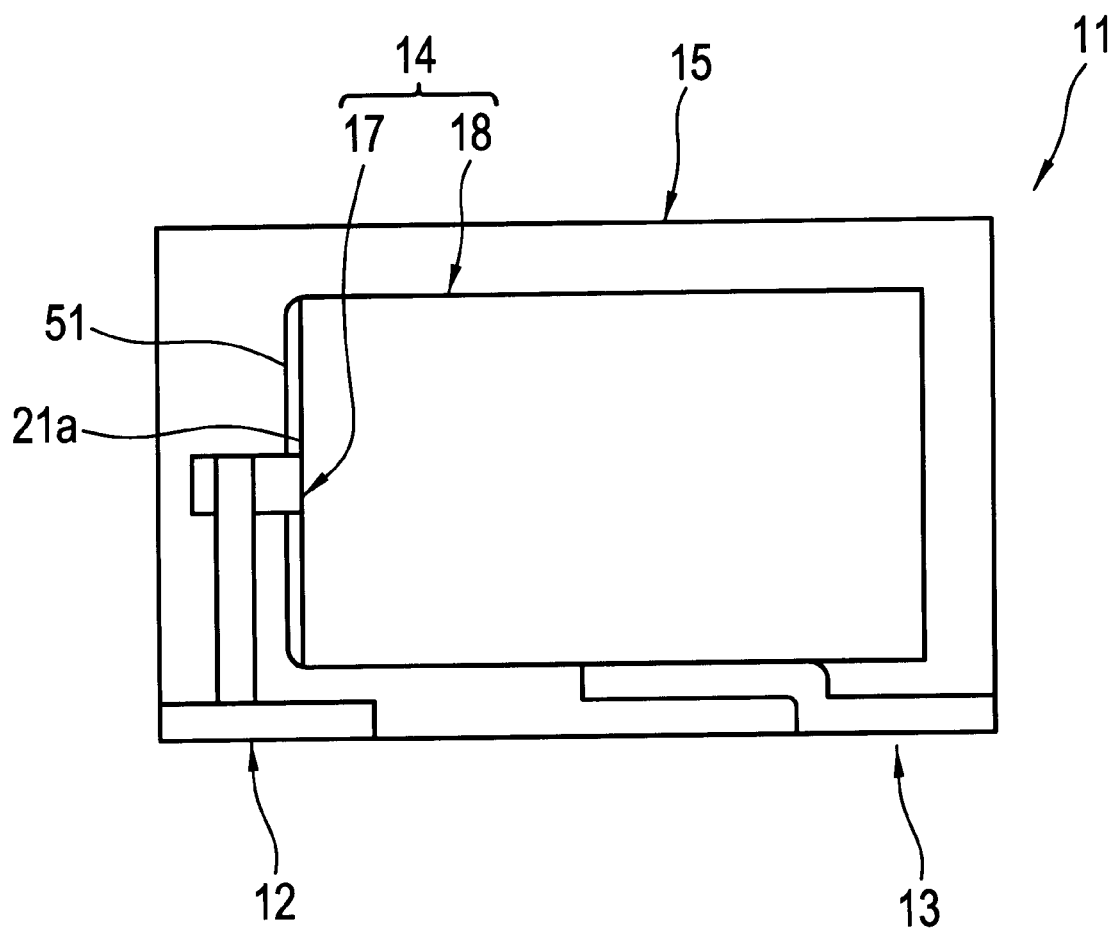
FIG. 15 is a front elevational view of a chip capacitor according to a modification 7 of the present invention, with an outer casing being shown as transparent.

As shown in FIG. 14, shield plate (shield member) 50 for blocking laser beam B from the proximal end of joint tongue 31 of anode terminal 21 to component body 18 is disposed between laser beam emitter 47 and capacitor component 14. In the welding process, laser beam B is applied from a position forward in the direction in which joint tongue 31 extends, to at least one of anode lead 17 and joint tongue 31.

Shield plate 50 thus provided is effective to prevent laser beam B which is not applied to the welded region from being applied from the proximal end of joint tongue 31 of anode terminal 21 to component body 18, i.e., the sintered body 21, so that a reflection from the region from being applied to component body 18 including sintered body 21. Thus, the quality of component body 18 is prevented from being lowered, making it possible to produce high-quality of chip capacitor 11. Because shield plate 50 which is not present in the gap between joint tongue 31 and component body 18, but is disposed between laser beam emitter 47 and capacitor component 14 is used, laser beam B can easily be blocked. Shield plate 50 should preferably comprise a copper plate of high heat conductivity.

[Modification 4]

In the above modification 3, shield plate 50 prevents laser beam B which is not applied to the welded region from being applied from the proximal end of joint tongue 31 of anode terminal 21 to component body 18, i.e., the sintered body 21. In the modification 3, the antireflection member applying process in which antireflection member 34 for preventing laser beam B from being reflected is applied so as to extend from the proximal end of joint tongue 31 of anode lead 12 toward component body 18 is not carried out. Therefore, antireflection member 34 is not provided on anode terminal 12. With this arrangement, shield plate 50 and resin-based insulating film layer 24 containing a white pigment are effective to prevent the quality of component body 18 from being lowered, making it possible to produce high-quality of chip capacitor 11.

[Modification 5]

In the modification 3, the resin-based insulating film layer forming process in which resin-based insulating film layer 24 containing a white pigment is formed on embedding surface 21a of sintered body 21 is not carried out, i.e., resin-based insulating film layer 24 containing a white pigment is not formed on embedding surface 21a of sintered body 21, but only water-repellent layer 25 is deposited on embedding surface 21a. With this arrangement, shield plate 50 and antireflection member 34 are effective to prevent the quality of component body 18 from being lowered, making it possible to produce high-quality of chip capacitor 11.

[Modification 6]

In the modification 3, the resin-based insulating film layer forming process in which a resin-based insulating film layer containing a white pigment is formed on embedding surface 21a of sintered body 21 is not carried out, and the antireflection member applying process in which antireflection member 34 for preventing laser beam B from being reflected is applied so as to extend from the proximal end of joint tongue 31 of anode lead 12 toward component body 18 is not carried out either. Specifically, resin-based insulating film layer 24 containing a white pigment is not formed on embedding surface 21a of sintered body 21, and antireflection member 34 is not formed on anode terminal 21 either. With this arrangement, shield plate 50 only is effective to prevent the quality of component body 18 from being lowered, making it possible to produce high-quality of chip capacitor 11.

[Modification 7]

In all of the above embodiment, the modification 1, the modification 3, and the modification 4, the resin-based insulating film layer forming process in which resin-based insulating film layer 24 containing a white pigment is formed on embedding surface 21a of sintered body 21 and the water-repellent layer forming process in which water-repellent layer 25 is deposited on resin-based insulating film layer 24 are replaced with a water-repellent layer forming process in which water-repellent layer 51 containing a white pigment similar to the white pigment described above in a given proportion (e.g., ranging from 1 weight % to 85 weight %) is formed on embedding surface 21a of sintered body 21. With this arrangement, only one water-repellent layer 51 containing a white pigment is formed on embedding surface 21a of sintered body 21. Water-repellent layer 51 may be formed of fluoroplastic. If water-repellent layer 51 is formed of fluoroplastic, then since it is heat-resistant, semiconductor layer 27 may be formed of manganese dioxide which needs to be heat-treated (semiconductor layer 27 may be formed of a conductive polymer in the same manner as described above). Inasmuch only one water-repellent layer 51 is formed on embedding surface 21a, the number of coating and curing cycles can be reduced.

While preferred embodiments of the present invention have been described using specific terms, such description is for illustrative purposes only, and it is to be understood that changes and variations may be made without departing from the spirit or scope of the following claims.

What is claimed is:

1. A chip capacitor comprising:
   a capacitor component having an anode lead, a sintered body of a metal having a valve action in which said anode lead is embedded so as to project from an embedding surface, and a cathode conductor layer disposed on said sintered body;
   an anode terminal having a portion bent into a joint tongue, said anode lead being placed on said joint tongue, said joint tongue and said anode lead being welded to each other by a laser beam into an anode terminal; and
   an antireflection member for preventing the laser beam from being reflected, said antireflection member extending from a proximal end of said joint tongue of said anode terminal toward said sintered body.

2. A chip capacitor according to claim 1, wherein said capacitor component comprises:
   a resin-based insulating film layer containing a white pigment and disposed on the embedding surface of said capacitor component; and
   a water-repellent layer disposed on said resin-based insulating film layer.

3. A chip capacitor according to claim 1, wherein said capacitor component comprises:
   a water-repellent layer containing a white pigment and disposed on the embedding surface of said capacitor component.

4. A chip capacitor according to claim 2, wherein said white pigment is contained in said resin-based insulating film layer at a proportion ranging from 1 weight % to 85 weight %.

5. A chip capacitor according to claim 3, wherein said white pigment is contained in said water-repellent layer at a proportion ranging from 1 weight % to 85 weight %.

6. A chip capacitor according to claim 2, wherein said water-repellent layer is made of fluoroplastic with silicone resin added thereto.

7. A chip capacitor according to claim 3, wherein said water-repellent layer is made of fluoroplastic with silicone resin added thereto.

8. A chip capacitor according to claim 6, wherein said silicone resin is added in a proportion ranging from 1 weight % to 40 weight %.

9. A chip capacitor according to claim 7, wherein said silicone resin is added in a proportion ranging from 1 weight % to 40 weight %.

10. A method of manufacturing a chip capacitor, comprising the steps of:
    a) shaping a powdery body of a metal having a valve action with a press, with an anode lead being embedded in powdery body and projecting from an embedding surface thereof, and sintering the shaped powdery body into an anode body;
    b) producing a capacitor component by forming a resin-based insulating film layer containing a white pigment on the embedding surface of said anode body, thereafter forming a water-repellent layer on said resin-based insulating film layer, thereafter forming an oxide film on a surface of said anode body and then forming a semiconductor layer on said anode body, and thereafter forming a cathode conductor layer on said semiconductor layer;
    c) placing said anode lead on a bent joint tongue and welding the joint tongue and the anode lead with a laser beam into an anode terminal; and
    d) coating an upper surface of a placement plate of a cathode lead terminal with a conductive adhesive, and bonding said cathode conductor layer to the cathode lead terminal with the conductive adhesive, thus forming a cathode terminal.

11. A method of manufacturing a chip capacitor, comprising the steps of:
    a) shaping a powdery body of a metal having a valve action with a press, with an anode lead being embedded in powdery body and projecting from an embedding surface thereof, and sintering the shaped powdery body into an anode body;
    b) producing a capacitor component by forming a water-repellent layer containing a white pigment on the embedding surface of said anode body, thereafter forming an oxide film on a surface of said anode body and then forming a semiconductor layer on said anode body, and thereafter forming a cathode conductor layer on said semiconductor layer;
    c) placing said anode lead on a bent joint tongue and welding the joint tongue and the anode lead with a laser beam into an anode terminal; and
    d) coating an upper surface of a placement plate of a cathode lead terminal with a conductive adhesive, and bonding said cathode conductor layer to the cathode lead terminal with the conductive adhesive, thus forming a cathode terminal.

12. A method according to claim 10, wherein said step c) includes the step of:
    providing an antireflection member for preventing the laser beam from being reflected, so as to extend from a proximal end of the joint tongue of said anode terminal toward said anode body, before the joint tongue and the anode lead are welded.

13. A method according to claim 11, wherein said step c) includes the step of:
    providing an antireflection member for preventing the laser beam from being reflected, so as to extend from a proximal end of the joint tongue of said anode terminal toward said anode body, before the joint tongue and the anode lead are welded.

14. A method according to claim 10, wherein said step c) includes the steps of:
    placing applying means for applying the laser beam, in a position forward in the direction in which said joint tongue extends, and applying the laser beam from said applying means to either one of said anode lead and said joint tongue; and
    blocking said laser beam with a shield member disposed between said applying means and said capacitor component and extending from a proximal end of the joint tongue of said anode terminal toward said anode body.

15. A method according to claim 11, wherein said step c) includes the steps of:
    placing applying means for applying the laser beam, in a position forward in the direction in which said joint tongue extends, and applying the laser beam from said applying means to either one of said anode lead and said joint tongue; and
    blocking said laser beam with a shield member disposed between said applying means and said capacitor component and extending from a proximal end of the joint tongue of said anode terminal toward said anode body.

* * * * *